(12) United States Patent
Kuchly et al.

(10) Patent No.: US 10,583,809 B2
(45) Date of Patent: Mar. 10, 2020

(54) FIXATION DEVICE FOR A WINDSHIELD WIPER DRIVE LINKAGE SYSTEM

(71) Applicant: Valeo Systèmes d'Essuyage, Le Mesnil Saint Denis (FR)

(72) Inventors: Nicolas Kuchly, Issoire (FR); Robin Viard, Issoire (FR); Pascal Renoux, Issoire (FR); Frédéric Baud, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 57 days.

(21) Appl. No.: 16/043,823

(22) Filed: Jul. 24, 2018

(65) Prior Publication Data
US 2019/0031149 A1    Jan. 31, 2019

(30) Foreign Application Priority Data
Jul. 28, 2017   (FR) ...................................... 17 57254

(51) Int. Cl.
*B60S 1/24*      (2006.01)
*B60S 1/04*      (2006.01)

(52) U.S. Cl.
CPC ............... *B60S 1/245* (2013.01); *B60S 1/043* (2013.01); *B60S 1/0436* (2013.01); *B60S 1/0447* (2013.01)

(58) Field of Classification Search
CPC ........ B60S 1/245; B60S 1/043; B60S 1/0436; B60S 1/0447
See application file for complete search history.

(56) References Cited

U.S. PATENT DOCUMENTS

| | | | | |
|---|---|---|---|---|
| 3,604,868 A | * | 9/1971 | Batcheller | H01H 3/20 200/437 |
| 5,114,203 A | * | 5/1992 | Carnes | B60R 13/00 296/191 |
| 6,449,798 B1 | * | 9/2002 | Rivin | B60S 1/166 15/250.3 |
| D698,193 S | * | 1/2014 | Tufano | D6/716.1 |
| 2003/0024206 A1 | * | 2/2003 | Polevoy | F16B 21/09 52/848 |
| 2005/0088069 A1 | * | 4/2005 | Greenwald | A47B 88/49 312/333 |

(Continued)

FOREIGN PATENT DOCUMENTS

| | | |
|---|---|---|
| FR | 2952881 A1 | 5/2011 |
| FR | 2964617 A1 | 3/2012 |
| FR | 3029476 A1 | 6/2016 |

OTHER PUBLICATIONS

Preliminary Search Report and Written Opinion issued in corresponding French Application No. 1757254, dated Mar. 12, 2018 (6 pages).

*Primary Examiner* — David M Fenstermacher
(74) *Attorney, Agent, or Firm* — Osha Liang LLP

(57) ABSTRACT

Fixing device (30) for a windscreen wiper actuation linkage system, this device comprising a plate (32) intended to be fixed onto a vehicle body (36), and at least one locking member (34) intended to cooperate with said body to lock the fixing of the plate onto the body, characterized in that said plate is configured to be displaced in translation in the joint plane with said body, and in that said locking member is mobile, deformable or displaceable from an unlocking position to a locking position.

20 Claims, 7 Drawing Sheets

(56) References Cited

U.S. PATENT DOCUMENTS

| | | | |
|---|---|---|---|
| 2007/0167089 A1* | 7/2007 | Gobron | H01R 13/025 439/860 |
| 2012/0167434 A1* | 7/2012 | Masters | F41C 23/16 42/90 |
| 2014/0170895 A1* | 6/2014 | Fredriks | H01R 4/2454 439/426 |
| 2014/0331479 A1* | 11/2014 | Baldwin | H02G 1/00 29/525.11 |
| 2015/0198408 A1* | 7/2015 | Kincel | F41C 23/16 42/72 |

* cited by examiner

FIXATION DEVICE FOR A WINDSHIELD WIPER DRIVE LINKAGE SYSTEM

TECHNICAL FIELD

The present invention relates in particular to a fixing device for a windscreen wiper actuation linkage system, and a method for using such a device.

STATE OF THE ART

A motor vehicle is conventionally equipped with windscreen wipers to ensure the washing of the windscreen and avoid the driver's view of his or her environment being disrupted. These windscreen wipers generally comprise a drive arm, performing an angular reciprocating movement, and elongate wipers, themselves bearing scraper blades produced in an elastic material. These blades rub against the windscreen and dispel the water by bringing it outside the field of view of the driver. The wipers are produced in the form, either, in a conventional version, of articulated stirrups which hold the scraper blade at several discrete points, conferring a bend upon it allowing it to closely follow any curvature of the windscreen, or, in a more recent version called "flat blade", of a semi-rigid assembly which holds the scraper blade over all of its length by virtue of one or more bending spines making it possible to press the wiper onto the windscreen without having to use stirrups.

In both solutions, the arm of each wiper is linked by its end opposite the wiper to a linkage system for the rotational driving thereof.

Conventionally, a linkage system comprises a link rod of which each longitudinal end is articulated on a crank secured in rotation to a drive shaft of a windscreen wiper, and more particularly the arm thereof.

Each longitudinal end of the link rod bears a ball joint box in which is pivotably mounted a crank pin secured to an end of a crank whose opposite end is secured to a drive shaft of a windscreen wiper. Each drive shaft is guided in rotation by a bearing which is borne by a support plate fixed onto the body of the vehicle.

A plate of such a linkage system, such as the support plate of a bearing, can be fixed by means of screw-nut type to the body.

Alternative solutions to this technology have already been proposed.

The document FR-A1-2 952 881 describes a windscreen wiper mechanism of which one bearing comprises runner elements allowing it to be slidingly mounted onto support elements secured to the body of the vehicle. The bearing is displaced in a direction parallel to the axis of the bearing and at right angles to the plane of the body and the sliding is performed until blocking means of the bearing and of the support elements cooperate together and secure the mounting. This alternative is not however satisfactory because it is complex and does not guarantee a good retention of the bearing in case of breakage of the blocking means.

The document FR-A1-3 029 476 describes a fixing device of a windscreen wiper bearing, which is mounted on the body of the vehicle by two successive displacements, which are respectively translational and rotational. The translational displacement in a direction parallel to the axis of the bearing makes it possible to engage elements protruding from a plate of the bearing in voids of the body, and the rotational displacement about the axis of the bearing makes it possible to block the plate with respect to the body, in a direction parallel to the axis of the bearing. At the end of the rotational travel, hooking or clip-fastening means make it possible to lock the mounting. However, this alternative is also not satisfactory because it is too bulky and also too heavy, the different pieces being produced in metal. In addition, the effort needed for the abovementioned rotation is very great and difficult to produce manually. Moreover, this technology is limited to a plate of which the bearing has a certain position and of which the displacements are performed with respect to the axis of this bearing. It does not seem possible to envisage using a plate with a bearing having another position, in as much as that would further adversely affect the bulk of the device.

The invention proposes a refinement to the existing technologies for fixing a windscreen wiper actuation linkage system, which is simple, effective and economical.

SUMMARY OF THE INVENTION

The invention proposes a fixing device for a windscreen wiper actuation linkage system, this device comprising a plate intended to be fixed onto a vehicle body, and at least one locking member borne by said plate or added thereto and intended to cooperate with said body to lock the fixing of the plate onto the body, said plate comprising at least one protruding element or hollowed element intended to cooperate by engagement with a complementary element of said body when the plate is mounted and bearing on said body, in a joint plane P, characterized in that said plate and said at least one element that it bears are configured to be displaced in translation in the joint plane P, from a first position of engagement/disengagement of said elements, to a blocking second position in which a travel of separation of the plate from the body is prevented or limited, in a direction at right angles to said joint plane, and in that said locking member is mobile, deformable or displaceable from an unlocking position in which said plate can be displaced between its first position and its second position, and vice versa, to a locking position in which said member is configured to cooperate with said body to immobilize said plate in its second position.

The invention thus proposes ensuring a blocking of the plate with respect to the body by translationally displacing the plate in the joint plane, then ensuring a locking of the assembly by means of the member which is either added, or deformed, or displaced, and which prevents the plate from returning to its initial position. This solution makes it possible to solve at least some of the problems and drawbacks listed above.

The device according to the invention can comprise one or more of the following features, taken in isolation from one another or in combination with one another:
 said plate is a support plate, in particular of a bearing,
 said at least one element of the plate protrudes on a surface of the plate intended to bear on a receiving face of said body,
 said at least one protruding element of the plate is fixed relative to the plate,
 said at least one protruding element of the plate defines at least one sliding space for a portion of said body,
 said plate comprises at least two protruding elements spaced apart from one another by a predetermined distance,
 said at least one element of the plate is formed by a through opening emerging on said joint plane P,
 said at least one locking member is added and configured to be engaged, in said locking position, in at least one first orifice of said plate and at least one second orifice of said body, said first and second orifices being intended to be aligned when said plate is in its second position, said at least one locking member is configured to adopt an intermediate stable position in which it is engaged in said at least one orifice of said plate but not in said at least one orifice of said body, and to allow a displacement of said plate in said first direction, said at least one locking member is configured to be displaced in a direction substantially at right angles to said joint plane P, said at least one locking member comprises a deformable tab formed of a single piece with the rest of said plate, said tab is deformable from said locking position in which it is substantially free without stress and cooperates by engagement with an orifice of said body, and said unlocking position in which it is deformed and intended to bear on said body in said joint plane P, said at least one locking member is rotationally mobile about an axis substantially parallel to said joint plane P.

The invention relates also to a windscreen wiper actuation linkage system, comprising at least one device as described above.

The present invention relates also to an assembly comprising a vehicle body and a device as described above, in which said body comprises at least one hollowed element or protruding element complementing said at least one element of said plate, so that said elements can cooperate together by engagement when the plate is mounted and bearing on said body, in said joint plane P.

The assembly according to the invention can comprise one or more of the following features, taken in isolation from one another or in combination with one another:

said at least one element of said body is hollowed and comprises at least one through opening emerging in said joint plane P, said at least one opening is in the general form of a T, L or keyhole, said at least one opening comprises a widened engagement portion and a narrower blocking portion, said blocking portion comprising two facing peripheral edges which are inclined relative to one another so as to converge on the side opposite said engagement portion, said body comprises a means which is configured to cooperate with said at least one locking member and which is either formed by said at least one element of said body, or distinct from that element.

The invention relates also to a method for using a device as described above, characterized in that it comprises:

a step of positioning said plate on a body, so that said plate is mounted and bearing on said body, in a joint plane P, and said elements cooperate together by engagement, a step of translational displacement of said plate and of said at least one element that it bears, in said joint plane P, between said first and second positions, and of locking said plate in its second position with respect to said body.

DESCRIPTION OF THE FIGURES

The invention will be better understood, and other details, features and advantages of the invention will become apparent on reading the following description given as a nonlimiting example and with reference to the attached drawings in which.

DETAILED DESCRIPTION

Figure 1:
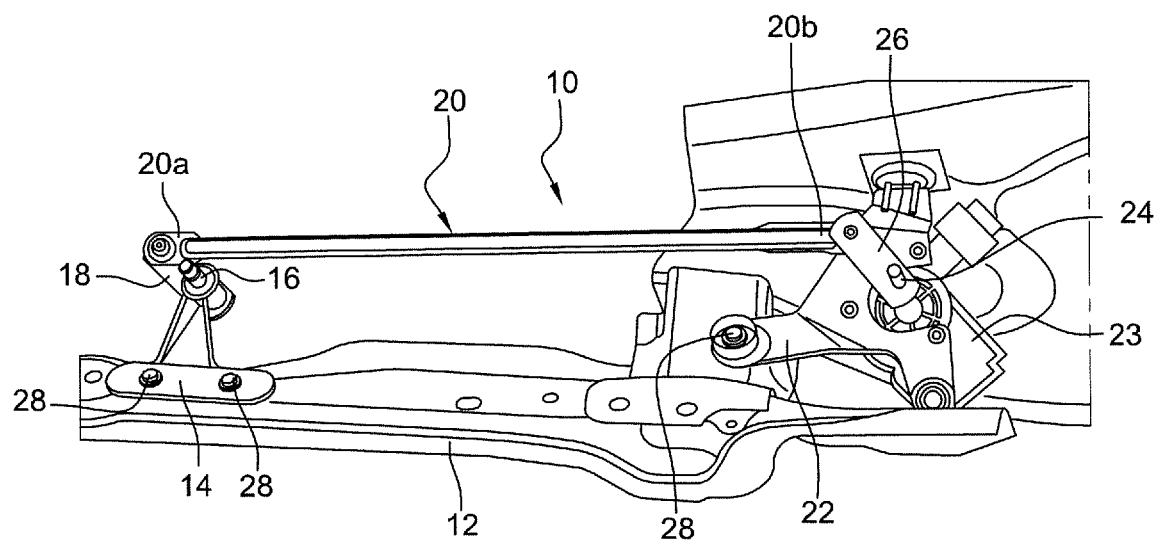
FIG. 1 is a perspective schematic view of a windscreen wiper actuation linkage system of a motor vehicle, according to the prior art.
Figure 2:
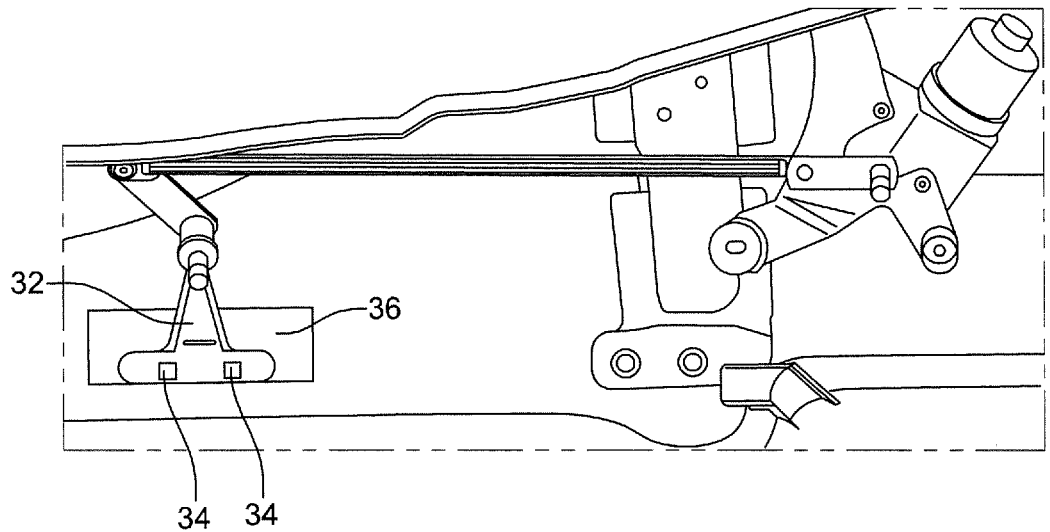
FIG. 2 is a perspective schematic view of a windscreen wiper actuation linkage system of a motor vehicle, according to the invention.
Figure 3:
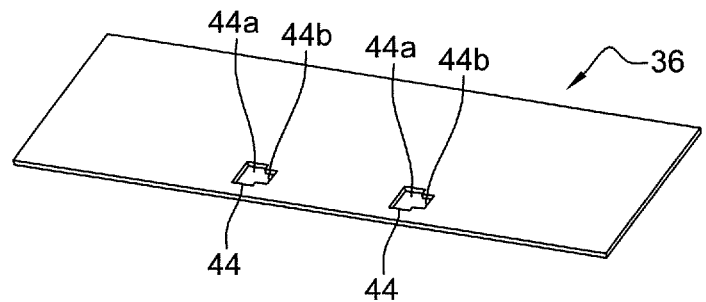
FIG. 3 is a perspective schematic view of a body part of FIG. 2.

Reference is made first of all to FIG. 1 which represents a linkage system 10 for the actuation of windscreen wipers of a motor vehicle.

The system 10 is typically fixed to the body 12 of the vehicle and comprises a support plate 14 for a bearing rotationally guiding a drive shaft 16 of a first windscreen wiper which is not represented. This first windscreen wiper conventionally comprises an actuation arm of a wiping wiper, a longitudinal end of the arm being secured to the shaft 16 and its opposite longitudinal end being connected to the wiping wiper bearing a scraper blade intended to wipe the windscreen of the vehicle.

The shaft 16 is also secured in rotation to an end of a crank 18, the other end of which is articulated to a first longitudinal end 20a of a connecting rod 20.

The system 10 comprises another support plate 22 for an electrical gear motor 23, the output shaft 24 of which is intended to drive a second windscreen wiper. This second windscreen wiper, not represented, is similar to that described in the above.

The output shaft 24 is also secured in rotation to an end of a crank 26, the other end of which is articulated to a second longitudinal end 20b of the connecting rod 20.

In the current art represented in FIG. 1, a plate of the system 10, such as the plate 14 or the plate 22, is fixed to the body 12 by conventional fixing means 28 of screw-nut type for example.

The invention proposes a refinement to this technology.

Figure 4:
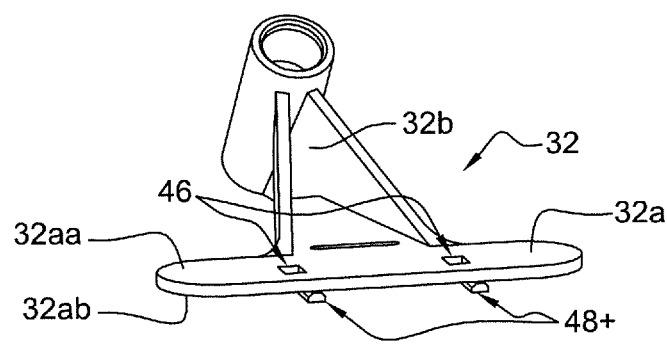
FIG. 4 is a perspective schematic view of a support plate for the system of FIG. 2.
Figure 5:
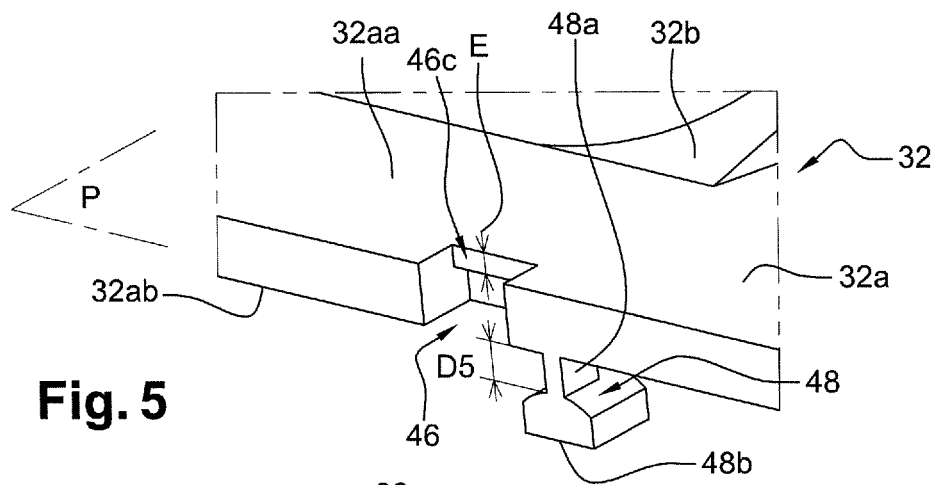
FIG. 5 is a larger scale cross-sectional view of the plate of FIG. 4.
Figure 6:
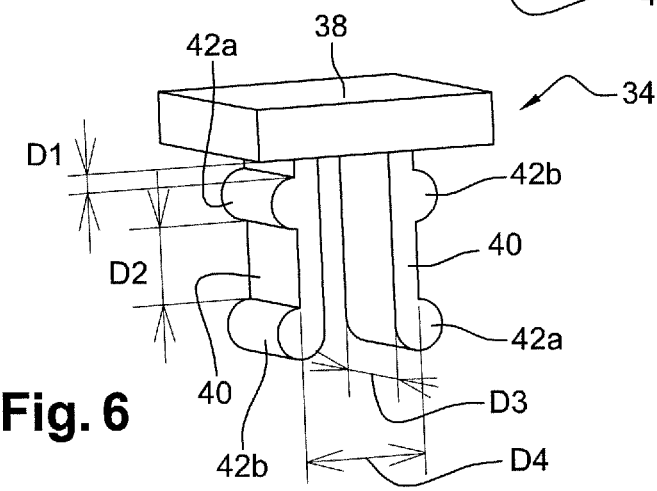
FIG. 6 is a perspective schematic view of a locking member for the system of FIG. 2, FIGS. 7a to 7d are perspective schematic views of the system of FIG. 2 and illustrate several steps of fixing this system and of use of the device according to the invention.

According to a first embodiment represented in FIGS. 2 to 8, the invention proposes a fixing device 30 comprising a specific plate 32 that can be seen in FIGS. 4 and 5 and at least one locking member 34 that can be seen in FIG. 6. The device 30 is intended to cooperate with a body 36, or body portion, which is also specific and represented in FIG. 3.

The device 30 here comprises two members 34 but could comprise fewer or more thereof.

Each member 34 (FIG. 6) comprises a head 38 and two legs 40 that are substantially parallel and linked to one and the same surface, here a bottom surface, of the head.

The head 38 has a generally parallelepipedal form. The legs 40 are separated from one another and have a generally elongate form. A longitudinal end of each leg is linked to the head 38, and its opposite longitudinal end is free.

The legs 40 are flexurally elastically deformable in a plane running through the legs and at right angles to the plane of the head 38.

The legs 40 bear elastic snap-fitting beads 42a, 42b. Each leg 40 bears a first bead 42a at its bottom end, and a second bead 42b situated at a predetermined distance D1 from the head 38 and a predetermined distance D2 from the bead 42a, measured along the axis of elongation of the leg. Here, D2 is greater than D1.

The beads 42a, 42b are generally in the form of a portion of a cylinder and for example semicylindrical as in the example represented. The beads 42a, 42b are oriented outwards, that is to say that the beads of one leg are oriented on the side opposite the other leg. In other words, the beads are situated on outer faces of the legs. These outer faces are separated from one another by a distance D3. Finally, the width of the legs is denoted D4.

The member 34 is, for example, produced in plastic material.

The body 36 comprises two orifices 44 or openings which are here identical. Each orifice 44 is intended to receive a protruding element of the plate 32 and the legs 40 of one of the members 34.

The orifices 44 are at a predetermined distance from one another. In the example represented, they are each in the general form of a T and comprise two portions: a widened portion 44a and a narrowed portion 44b.

Each of the portions 44a, 44b has a generally rectangular form, the narrowed portion 44b being able to have a generally trapezoidal form the small base of which is situated on the side opposite the widened portion 44a. The portion 44a is dimensioned to cooperate by engagement with a locking member 34. For that, it has a length close to the distance D3 and a width slightly greater than D4. It will thus be understood that the member 34 can be engaged in the orifice 44 and in particular its widened portion 44a, its beads 42a being capable of cooperating by elastic snap-fitting with the facing peripheral edges of this widened portion 44a.

The portion 44b is dimensioned to cooperate by engagement and sliding with a protruding element of the plate 32, which can be seen in FIG. 5.

The plate 32 comprises a base 32a for fixing onto the body 36 and an arm 32b supporting a bearing. The base 32a is substantially planar and comprises a top face 32aa and a bottom face 32ab. The bottom face 32ab is intended to be pressed onto a receiving face of the body 36 and the top face is intended to receive the member 34 and in particular its head 38.

The plate 32, and in particular its base 32a, comprises two orifices 46 for the passage of the members 34, each orifice 46 here having a generally rectangular form. Each orifice 46 is intended to be aligned with one of the orifices 44 of the body, and more particularly with its widened portion 44a, in order for a member 34 to be mounted.

Each orifice 46 is thus dimensioned to cooperate by engagement with a member 34 and has a length close to the distance D3 and a width slightly greater than D4. It will thus be understood that the member 34 can be engaged in the orifice 46, its beads 42a and 42b being sequentially capable of cooperating by elastic snap-fitting with the facing peripheral edges 46c of this orifice 46.

The plate 32 has a certain thickness and can comprise thinned portions at the edges 46c to allow the elastic snap-fitting of the member 34. Thus, the thickness E of the edges 46c, which is possibly thinned, is preferably less than or equal to the distance D1.

Each member 34 is intended to cooperate with the plate 32 and the body 36 by a double elastic snap-fitting. In an intermediate but stable position of the member on the plate, for example a position of pre-mounting and of delivery of the device, the members 34 are engaged in the orifices 46 of the plate so that the thinned edges 46c of the plate are situated between the beads 42a, 42b of the legs of the member. This intermediate position does not hamper the manipulation of the plate and the mounting thereof on the body, particularly if the beads 42a are designed to be housed in the setback created under the thinned edges 46c, on the side of the bottom face 32ab of the plate. In this case, the beads 42a do not hamper the pressing of the plate onto the receiving face of the body.

Once the orifices 44, 46 of the plate 32 and of the body 36 are aligned, the members 34 can be pressed in more into the orifices 46 of the plate and into the orifices 44 of the body, so that the beads 42b are snap-fitted under the thinned edges 46c and the other beads 42a are snap-fitted under the body. The abovementioned distance D2 is therefore a function in particular of the thickness of the body, at its orifices 44.

As stated above, the plate 32 comprises protruding elements 48, here two of them, which are intended to cooperate by engagement and sliding with the orifices 44 of the body 36.

The elements 48 protrude on the bottom face 32ab of the plate. They are situated at a predetermined distance from one another, substantially equal to the distance between the orifices 46, and are arranged in the vicinity of these orifices 46, on one and the same side.

Each protruding element 48 has a generally mushroom form, and comprises a stem 48a and a cap 48b. The stem 48a extends between the bottom face 32ab of the plate and the cap 48b. The stem 48a is thinned relative to the cap 48b and extends substantially at right angles to the face 32ab.

The cap 48b is therefore wider than the stem and defines, with the bottom face 32ab, a space all around the stem in which the body 36 can slide. On the side of this space, the cap 48b has a top surface that is domed to strain the body during the abovementioned sliding. The distance D5 between the cap 48b and the face 32ab is therefore a function in particular of the thickness of the body, particularly in the vicinity of the orifices 44.

The cap 48b has a generally parallelepipedal form and has a length slightly less than that of the widened portion 44a of the orifice 44, and greater than that of the narrowed portion 44b of this orifice. The cap has a width slightly less than that of the widened portion.

The stem 48a also has a generally parallelepipedal form and has a width slightly less than the length of the narrowed portion 44b so as to be able to engaged by sliding in this portion 44b.

Moreover, the distance between each element 48 and the closest orifice 46 is a function of the distance between the two parallel and facing peripheral edges of the portions 44a, 44b of one and the same orifice 44, so that, when the stem 48a of an element is housed in the narrowed portion 44b of an orifice 44, the widened portion 44a of this orifice can be aligned with the corresponding orifice 44 of the body.

The plate 32 is fixed to the body 36 by displacing the plate in two translational stages, then by adding the members 34 in the orifices 46, 44 of the plate and of the body.

Figure 7A:
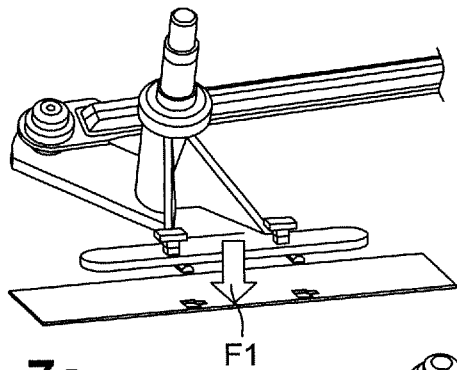
Figure 7B:
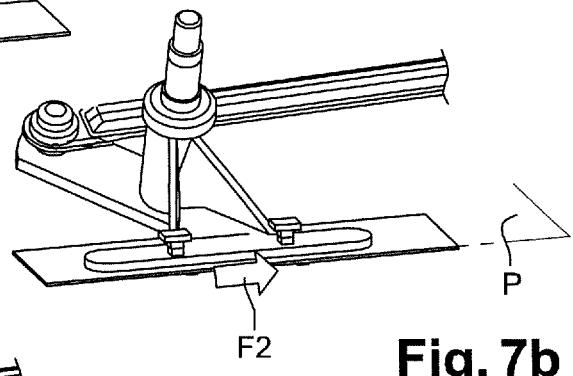
Figure 7C:
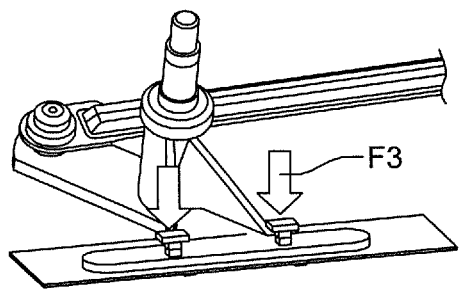
Figure 7D:
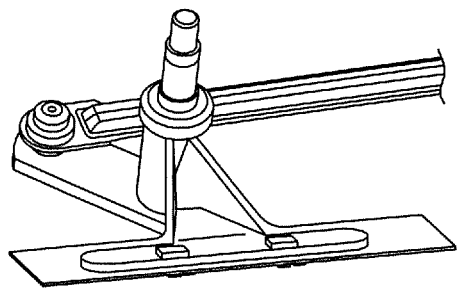

The plate 32 is first of all arranged above the body, parallel thereto and in such a way that the protruding elements 48 are aligned with the widened portions 44a of the orifices (FIG. 7a). The plate is then translationally displaced (arrow F1) in a direction at right angles to the plane of the base 32a towards the body, until its bottom face 32ab bears on the receiving face of the body (FIG. 7B). P is then defined as being the joint plane of the plate and of the body, passing through the abovementioned faces. During this translation, the protruding elements 48 are engaged in the widened portions of the orifices 44.

The plate is then translationally displaced (arrow F2) in the joint plane P, in a direction such that its protruding elements 48, and in particular its stems 48a, slide into the portions 44b of the orifices. As described above, this portion 44b can have a trapezoidal form so that the displacement becomes more difficult as the stem moves away from the portion 44a, which guarantees (by virtue of friction forces) a first securing of the plate with respect to the body. The peripheral edges of the body, extending around the portions 44b, are then housed in the abovementioned spaces defined between the caps 48b of the mushrooms and the bottom face 32ab of the plate. In this position, the portions 44a are aligned with the orifices 46 of the plate.

Figure 8:
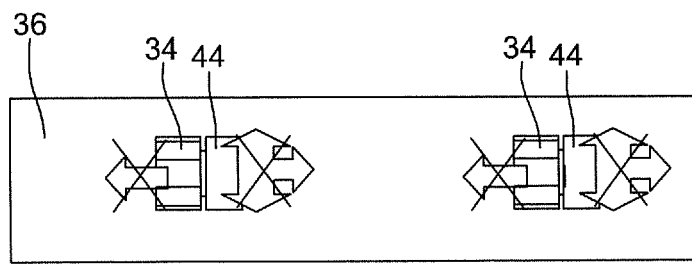
FIG. 8 is a bottom schematic view of the body and of the system in the position represented in FIG. 7d.

The members 34 are then mounted in the orifices 44, 46. For that, they are arranged above the plate such that their legs 40 are oriented towards the orifices 46 and ready to be engaged therein. They are then translationally displaced until their beads 42a are snap-fitted under the thinned edges 46c. The translation is continued until the beads 42b are snap-fitted under the thinned edges 46c and the beads 42a are snap-fitted under the body (arrow F3—FIG. 7c). The plate is then locked in as much as it is prevented from being displaced in the joint plane P and the protruding elements prevent any displacement of the plate with respect to the body in a direction at right angles to the joint plane (FIG. 8).

As a variant, and as described in the above, the members 34 can be pre-mounted in the orifices 46 of the plate before the latter is brought closer to the body, as is shown in FIGS. 7a to 7d.

Figure 9:
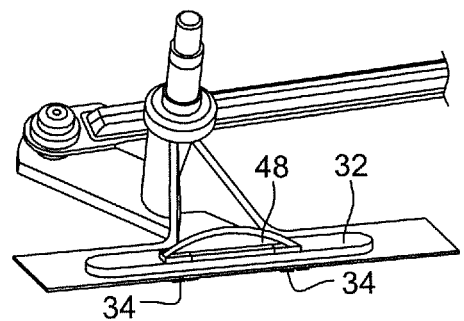
FIG. 9 is a view similar to that of FIG. 7d and illustrating a variant embodiment of a system according to the invention.
Figure 10:
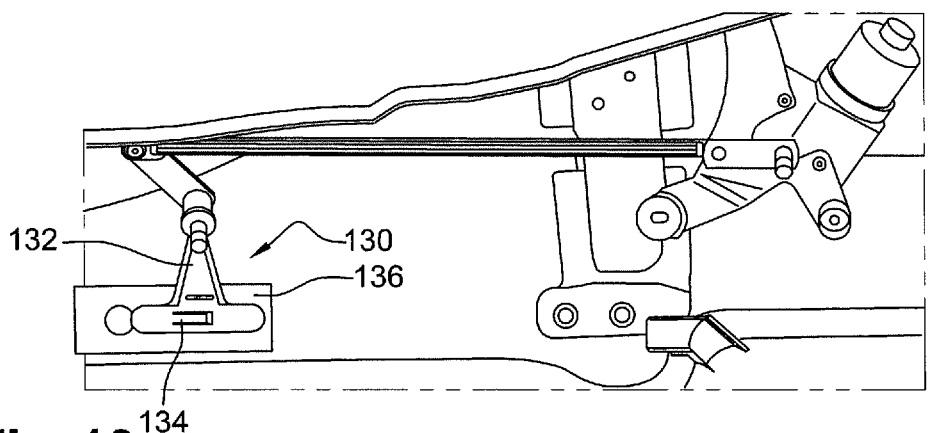
FIG. 10 is a perspective schematic view of another variant embodiment of a windscreen wiper actuation linkage system of a motor vehicle, according to the invention.
Figure 11:
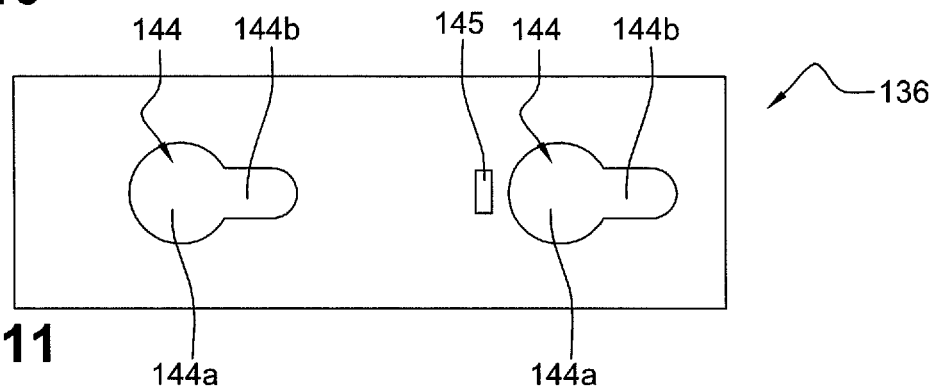
FIG. 11 is a perspective schematic view of a body part of FIG. 10.

In the variant represented in FIG. 9, the two members 34 are contiguous and formed of a single piece with a gripping means 48 of handle type which is intended to rest on the top face of the plate 32 after the members are snap-fitted under the body.

Figure 12:
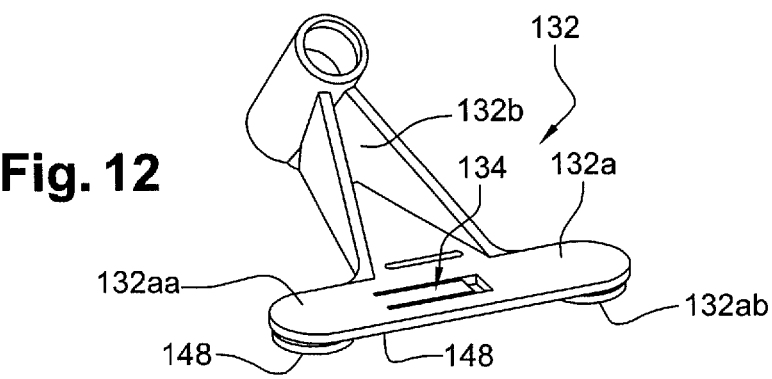
FIG. 12 is a perspective schematic view of a support plate for the system of FIG. 10.
Figure 13:
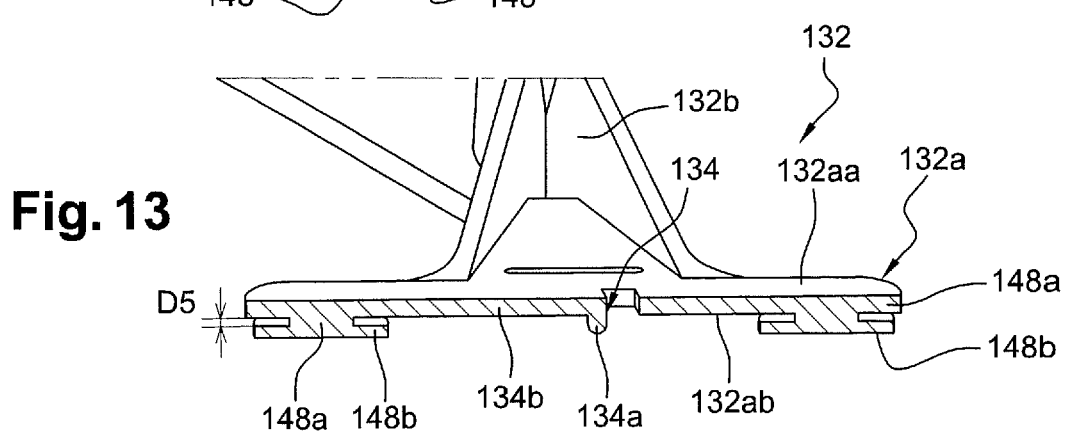
FIG. 13 is a larger scale cross-sectional view of the plate of FIG. 12, FIGS. 14a to 14e are perspective schematic views of the system of FIG. 10, and illustrate several steps of fixing this system and of use of the device according to the invention.

According to another embodiment represented in FIGS. 10 to 15, the invention proposes a fixing device 130 comprising a specific plate 132 that can be seen in FIGS. 12 and 13 and is equipped with at least one locking member 134. The device 130 is intended to cooperate with a body 136, or body portion, which is also specific and represented in FIG. 11.

The body 136 comprises two orifices 144 or openings which are here identical. Each orifice 144 is intended to receive a protruding element of the plate 132.

The orifices 144 are at a predetermined distance from one another. In the example represented, they are each in the general form of a keyhole and comprise two portions, a widened portion 144a and a narrowed portion 144b.

The portion 144a has a generally circular form. The portion 144b has a generally rectangular form, of which the peripheral edge, opposite the portion 144a, is concave rounded.

Figure 16:
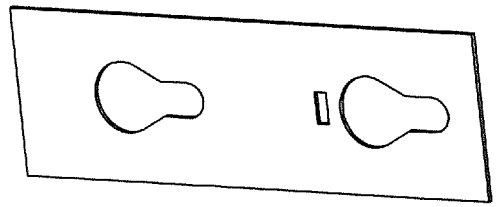
FIG. 16 is a view similar to that of FIG. 11 and illustrating a variant embodiment of the body part.
Figure 17:
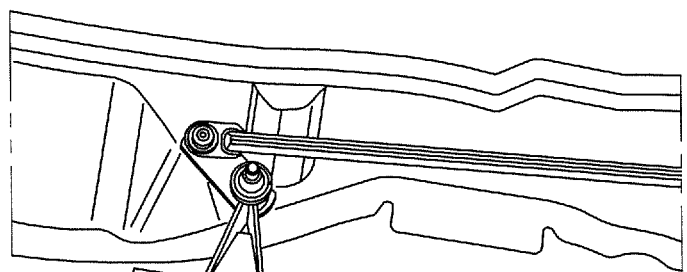
FIG. 17 is a perspective schematic view of another variant embodiment of a windscreen wiper actuation linkage system of a motor vehicle, according to the invention.
Figure 18:
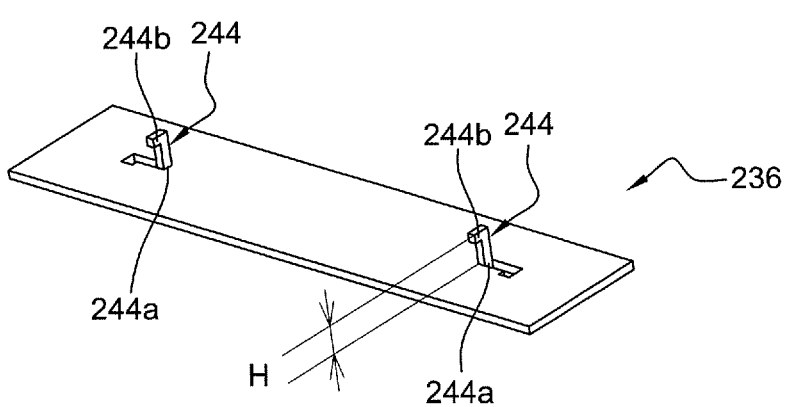
FIG. 18 is a perspective schematic view of a body part of FIG. 17.

As a variant, and as represented in FIG. 16, the orifices could have a different form with, for example, a light bulb profile. The widened portion would then be linked to the narrowed portion by a portion of trapezoidal form, whose lateral edges converge on the side of the narrowed portion. This makes it possible to better retain the plate during the mounting thereof.

The portion 144a is dimensioned to cooperate by engagement with a protruding element of the plate 132. The portion 144b is dimensioned to cooperate by engagement and sliding with this protruding element. The body comprises another orifice 145 or another opening, which is away from the orifices 144 and arranged here between them. This orifice 145 has a generally rectangular form in the example represented. The orifices 144 and 145 are aligned on one and the same virtual line.

The plate 132 comprises a base 132a for fixing onto the body 136 and an arm 132b supporting a bearing. The base 132a is substantially planar and comprises a top face 132aa and a bottom face 132ab. The bottom face 132ab is intended to be pressed onto a receiving face of the body 136.

The device 130 here comprises a single member 134 but could comprise more thereof.

Each member 134 (FIGS. 12 and 13) comprises a snug 134a borne by a flexible tab 134b. The tab 134b has a generally elongate form, of which one longitudinal end is linked to the rest of the plate 132 and its opposite end is free and bears the snug 134a.

The tab 134b and the snug 134a are formed of a single piece with the rest of the plate and the tab is delimited on three of its four sides by a peripheral and through slit formed in the base of the plate, substantially in the middle thereof (FIG. 12).

The snug 134a protrudes on the bottom face 132ab of the plate when the tab is in the unstressed free state (FIG. 13). The tab is flexurally deformable in a plane at right angles to the base and containing the axis of elongation of the tab 134b.

The snug 134a is conformed to cooperate by elastic snap-fitting with the orifice 145 of the body.

The plate 132 and in particular its base 132a comprises protruding elements 148, here two of them, which are intended to cooperate by engagement and sliding with the orifices 144 of the body 136.

The elements 148 protrude on the bottom face 132*ab* of the plate. They are situated at a predetermined distance from one another which is substantially equal to the distance between the orifices 144.

Each protruding element 148 has a generally mushroom form and comprises a stem 148*a* and a cap 148*b*. The stem 148*a* extends between the bottom face 132*ab* of the plate and the cap 148*b*. The stem 148*a* is thinned relative to the cap 148*b* and extends substantially at right angles to the face 132*ab*.

The cap 148*b* is therefore wider than the stem and defines, with the bottom face 132*ab*, a space all around the stem in which the body 136 can slide. The distance D5 between the cap 148*b* and the face 132*ab* is therefore a function in particular of the thickness of the body, particularly in the vicinity of the orifices 144.

The cap 148*b* has a generally cylindrical form and has a diameter slightly less than that of the widened portion 144*a* of the orifice 144, and greater than the width of the narrowed portion 144*b* of this orifice.

The stem 148*a* also has a generally cylindrical form and has a diameter slightly less than the width of the narrowed portion 144*b* so as to be able to engaged by sliding in this portion 144*b*.

The plate 132 is fixed to the body 136 by displacing the plate in two translational stages, until the snugs 134*a* snap-fit into the orifices 145.

Figure 14A:
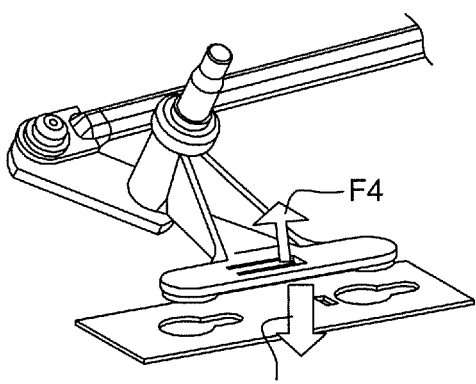

The plate 132 is first of all arranged above the body, parallel thereto and in such a way that the protruding elements 148 are aligned with the widened portions 144*a* of the orifices (FIG. 14*a*). The plate is then translationally displaced in a direction at right angles to the plane of the base 132*a* towards the body, until its bottom face 132*ab* bears on the receiving face of the body (arrow F1). P is then defined as being the joint plane of the plate and of the body, passing through the abovementioned faces. During this translation, the protruding elements 148 are engaged in the widened portions of the orifices 144. Once the bearing is achieved, the snug 134*a* bears on the top face 132*aa* of the plate and the tab 134 is flexurally deformed (arrow F4).

Figure 14B:
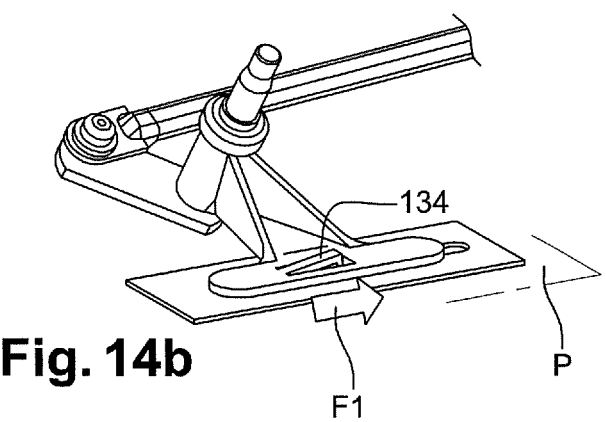
Figure 14C:
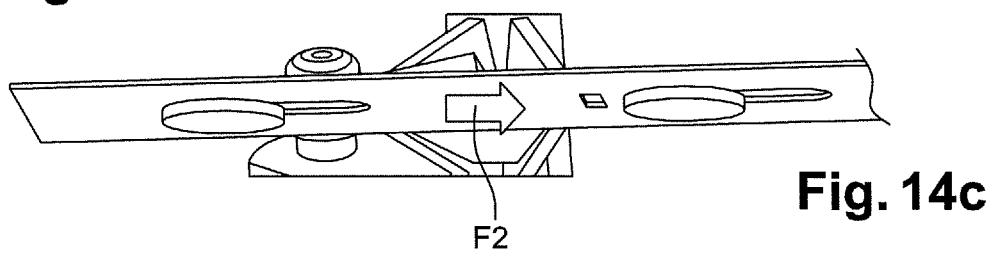

The plate is then translationally displaced in the joint plane P, in a direction such that its protruding elements 148, and in particular its stems 148*a*, slide into the portions 144*b* of the orifices (arrow F2—FIGS. 14*b* and 14*c*). The peripheral edges of the body, extending around the portions 144*b*, are then housed in the abovementioned spaces defined between the caps 148*b* of the mushrooms and the bottom face 132*ab* of the plate.

Figure 14D:
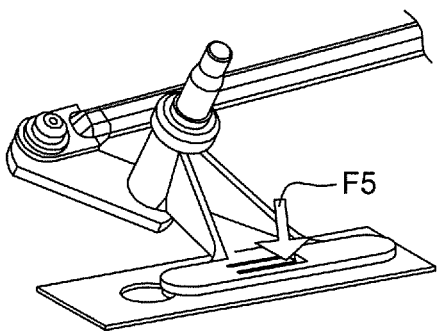
Figure 14E:
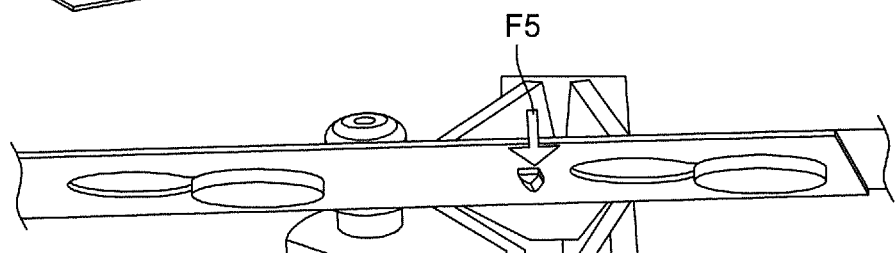
Figure 15:
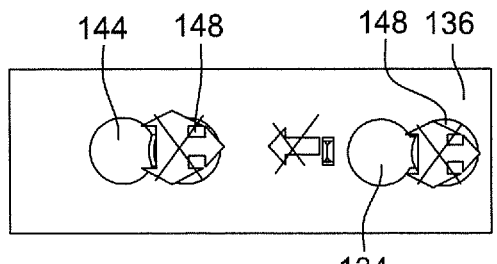
FIG. 15 is a bottom schematic view of the body and of the system in the position represented in FIG. 14e.

In this position, the snug 134*a* is snap-fitted into the orifice 145 of the body (arrow F5—FIGS. 14*d* and 14*e*). The plate is then locked in as much as it is prevented from being displaced in the joint plane P and the protruding elements 148 prevent any displacement of the plate with respect to the body in a direction at right angles to the joint plane (FIG. 15).

Figure 19:
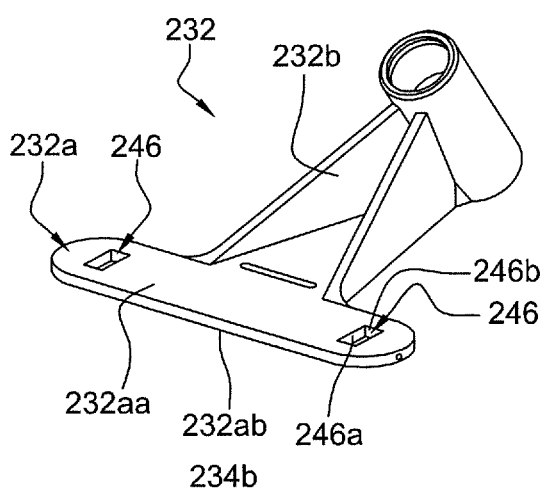
FIG. 19 is a perspective schematic view of a support plate for the system of FIG. 17.
Figure 20:
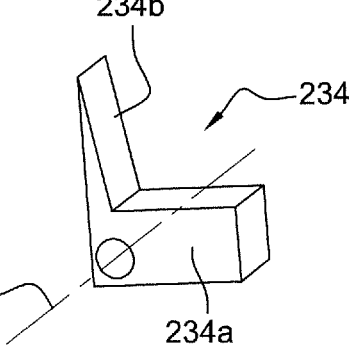
FIG. 20 is a perspective schematic view of a locking member for the system of FIG. 17, and FIGS. 21a to 21c are perspective schematic views of the system of FIG. 17, and illustrate several steps of fixing this system and of use of the device according to the invention.

According to another embodiment represented in FIGS. 17 to 21*c*, the invention proposes a fixing device 230 comprising a specific plate 232 that can be seen in FIG. 19 and is equipped with at least one locking member 234 that can be seen in FIG. 20. The device 230 is intended to cooperate with a body 236, or body portion, which is also specific and represented in FIG. 18.

The body 236 comprises two tabs 244 obtained by cutting and folding the body 236. The tabs are generally L-shaped and extend substantially at right angles relative to the plane of the body. They protrude on the receiving face of the body 136, that is to say the face intended to receive the plate 132.

Each tab 244 comprises two rectilinear portions of which one 244*a* extends at right angles to the abovementioned receiving face, and the other 244*b* parallel and at a distance H from this face. The tabs 244 are at a predetermined distance from one another.

The plate 232 comprises a base 232*a* for fixing onto the body 236 and an arm 232 supporting a bearing. The base 232*a* is substantially planar and comprises a top face 232*aa* and a bottom face 232*ab*. The bottom face 232*ab* is intended to be pressed onto the receiving face of the body 236.

The base 232*a* comprises two orifices 246 or openings intended to cooperate by engagement and sliding with the tabs 244 of the body. Each orifice 246 is generally L-shaped and comprises two portions. A first portion 246*a* of each orifice has an elongate rectilinear form and is conformed to allow the passage of the tab 244, and in particular of its portion 244*b*, during a translation of the plate 232 towards the body in a direction substantially at right angles to the plane of the body. A second portion 246*b* of each orifice has an elongate rectilinear form and is conformed to allow the passage of the tab 244, and in particular of its portion 244*a*, during a translation of the plate 232 in a joint plane of the plate and of the body.

The device 230 here comprises two members 134 but could comprise fewer or more thereof.

Each member 234 (FIG. 20) is generally L-shaped and comprises two branches 234*a*, 234*b* of which the link zone is articulated about a transverse axis C. The axis C is defined by a cylindrical stem (not represented) which passes through an orifice of the member 234 and which is engaged in voids of complementary form provided in the orifices 246 of the plate.

The branch 234*a* of each member 234 can be configured to be able to be manipulated and displaced manually, for the pivoting of the member 234 about the axis C. The other branch 234*b* of the member can be thinned and configured to cooperate by elastic or plastic deformation with the portion 244*b* of a tab 244.

The plate 232 is fixed to the body 236 by displacing the plate in two translational stages, as described in the above, then by pivoting the members 234 until the plate 232 is locked with respect to the body 236.

Figure 21A:
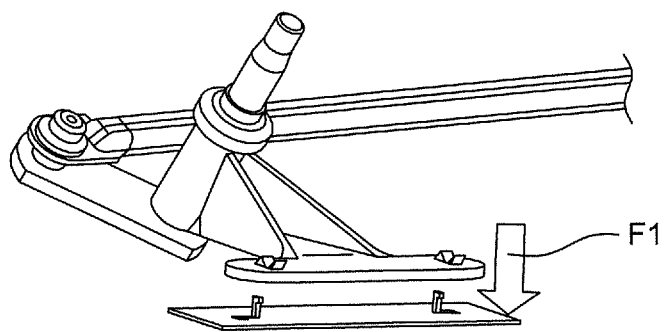
Figure 21B:
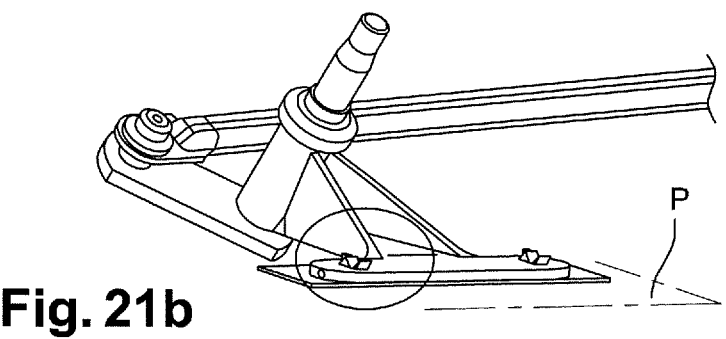
Figure 21C:
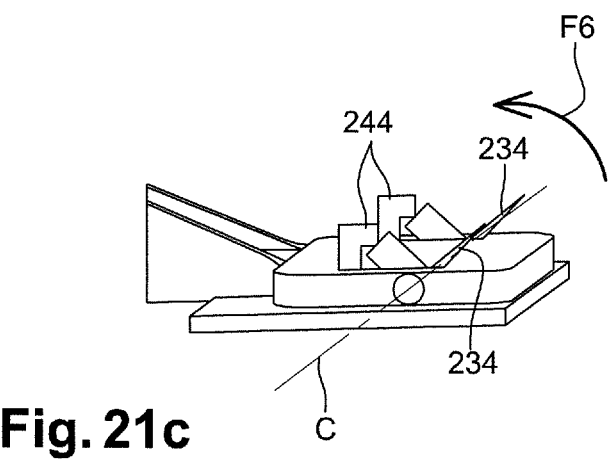

The plate 232 is first of all arranged above the body, parallel thereto and in such a way that its orifices 246 are aligned with the tabs 244 of the body (FIG. 21*a*). The plate is then translationally displaced (arrow F1) in a direction at right angles to the plane of the base 232*a* towards the body, until its bottom face 232*ab* bears on the receiving face of the body (FIG. 21*b*). P is then defined as being the joint plane of the plate and of the body, passing through the abovementioned faces. During this translation, the tabs 244 are engaged in the portions 246*a* of the orifices 246. The plate is then translationally displaced in the joint plane P, in a direction such that the tabs 244, and in particular their portions 244*a*, slide in the portions 234*b* of the orifices. The members 234 are then rotationally displaced about their respective axes C so that their branches 234*b* come to be inserted between the portions 244*b* of the tabs and the top face 232*aa* of the base of the plate, as can be seen in FIG. 21*c* (arrow F6). The plate is then locked onto the body.

The device can comprise a varied number of fixing members. This number depends for example on the dimensioning of the member and on the forces to which it is intended to be exposed in operation.

The invention claimed is:

1. A fixing device for a windscreen wiper actuation linkage system, this device comprising:

a plate configured to be fixed onto a vehicle body; and at least one locking member borne by said plate or added thereto and that cooperates with said body to lock the fixing of the plate onto the body, said plate comprising at least one protruding element or hollowed element that cooperates by engagement with a complementary element of said body when the plate is mounted and bearing on said body, in a joint plane P, wherein said plate and said at least one protruding or hollowed element that it bears are configured to be displaced in translation in the joint plane P, from a first position of engagement/disengagement of said elements, to a blocking second position in which a travel of separation of the plate from the body is prevented or limited, in a direction at right angles to said joint plane, and wherein said locking member is mobile, deformable or displaceable from an unlocking position in which said plate can be displaced between the first position and the second position, and vice versa, to a locking position in which said member is configured to cooperate with said body to immobilize said plate in the second position.

2. The device according to claim 1, in which said plate is a support plate, of a bearing.

3. The device according to claim 1, in which said at least one element of the plate protrudes on a surface of the plate that bears on a receiving face of said body.

4. The device according to claim 3, in which said at least one protruding element of the plate is fixed relative to the plate.

5. The device according to claim 3, in which said at least one protruding element of the plate defines at least one sliding space for a portion of said body.

6. The device according to claim 3, in which said plate comprises at least two protruding elements spaced apart from one another by a predetermined distance.

7. The device according to claim 1, in which said at least one element of the plate is formed by a through opening emerging on said joint plane P.

8. The device according to claim 1, in which said at least one locking member is added and configured to be engaged, in said locking position, in at least one first orifice of said plate and at least one second orifice of said body, said first and second orifices being intended to be aligned when said plate is in its second position.

9. The device according to claim 8, in which said at least one locking member is configured to adopt an intermediate stable position in which it is engaged in said at least one orifice of said plate but not in said at least one orifice of said body, and to allow a displacement of said plate in said first direction.

10. The device according to claim 9, in which said at least one locking member is configured to be displaced in a direction substantially at right angles to said joint plane P.

11. The device according to claim 1, in which said at least one locking member comprises a deformable tab formed of a single piece with the rest of said plate.

12. The device according to claim 11, in which said tab is deformable from said locking position in which the tab is substantially free without stress and cooperates by engagement with an orifice of said body, and said unlocking position in which the tab is deformed and intended to bear on said body in said joint plane P.

13. The device according to claim 1, in which said at least one locking member is rotationally mobile about an axis substantially parallel to said joint plane P.

14. A windscreen wiper actuation linkage system, comprising at least one device according to claim 1.

15. An assembly comprising:
a vehicle body; and
a device according to claim 1,
in which said body comprises at least one hollowed element or protruding element complementing said at least one element of said plate, so that said elements can cooperate together by engagement when the plate is mounted and bearing on said body, in said joint plane P.

16. The assembly according to claim 15, in which said at least one element of said body is hollowed and comprises at least one through opening emerging in said joint plane P.

17. The assembly according to claim 16, in which said at least one opening is in the general form of a T, L or keyhole.

18. The assembly according to claim 16, in which said at least one opening comprises a widened engagement portion and a narrower blocking portion, said blocking portion comprising two facing peripheral edges which are inclined relative to one another so as to converge on the side opposite said engagement portion.

19. The assembly according to claim 16, in which said body comprises a means which is configured to cooperate with said at least one locking member and which is either formed by said at least one element of said body, or distinct from that element.

20. A method for using a device according to claim 1, the method comprising:
positioning said plate on a body, so that said plate is mounted and bearing on said body, in a joint plane P, and said elements cooperate together by engagement; and
translational displacement of said plate and of said at least one element that it bears, in said joint plane P, between said first and second positions, and of locking said plate in its second position with respect to said body.

* * * * *